United States Patent [19]

Frederick

[11] Patent Number: 4,509,899
[45] Date of Patent: Apr. 9, 1985

[54] TRAVERSING BLADE-ROTARY PROPELLER

[76] Inventor: Larry J. Frederick, P.O. Box 794 SLU, Hammond, La. 70402

[21] Appl. No.: 460,032

[22] Filed: Mar. 28, 1983

[51] Int. Cl.³ .............................................. B64C 11/46
[52] U.S. Cl. ...................................... 416/99; 416/123
[58] Field of Search ................. 416/99, 175, 122, 123, 416/121 R, 120

[56] References Cited

U.S. PATENT DOCUMENTS

| | | | |
|---|---|---|---|
| 1,229,243 | 6/1917 | Eberhardt | 416/99 |
| 1,274,886 | 8/1918 | Jacobson | 416/99 |
| 1,915,209 | 6/1933 | Young | 416/99 |
| 2,312,627 | 3/1943 | Cohen | 416/121 |
| 2,466,787 | 4/1949 | Whisler et al. | 416/99 |
| 2,587,247 | 2/1952 | Turner | 416/121 |
| 3,246,861 | 4/1966 | Curci | 416/99 X |
| 3,762,669 | 10/1973 | Curci | 416/99 X |

FOREIGN PATENT DOCUMENTS

| | | | |
|---|---|---|---|
| 601900 | 3/1926 | France | 416/99 |
| 643138 | 9/1928 | France | 416/99 |
| 651567 | 2/1929 | France | 416/123 |
| 907290 | 3/1946 | France | 416/99 |
| 948561 | 8/1949 | France | 416/99 |
| 211766 | 2/1924 | United Kingdom | 416/123 |

*Primary Examiner*—Everette A. Powell, Jr.
*Attorney, Agent, or Firm*—Llewellyn A. Proctor

[57] ABSTRACT

A traversing blade rotary propeller useful as a propulsion system for various types of boats and aircraft or as a wind or water actuated turbine. A traversing blade rotary propeller of this type includes a stationary main shaft, a mount to which an end of the stationary main shaft is affixed, a central housing structured to carry a pair of alternately disposed, perpendicularly projecting radial arm shafts, and where the device is used as a propulsion system, power means for rotation of said central housing relative to the fixed axis formed by said stationary main shaft. A pair of propeller shafts extend perpendicularly from an end of each of said radial arm shafts, and flat propeller blades are attached to each. The inboard ends of each of the radial arm shafts are operatively engaged with the stationary main shaft, and the outboard ends are operatively engaged with the propeller shafts, as via gears such that rotation of the central housing produces rotation of the propeller shafts. The propeller shafts are mounted perpendicular to the radial arm shafts, and equally and oppositely deflected at an angle relative to a line passing parallel to the axes of the radial arms to perpendicularly intersect the stationary main shaft. During rotation the propeller blades maintain a fixed vertical (or horizontal) orientation while the outwardly faced edges thereof oscillate in equal and opposite directions, one counterbalancing the other, across the swath defined by the circle made by the path defined by the outer terminal ends of the radial arms which revolve about the stationary main shaft.

13 Claims, 13 Drawing Figures

SECTION A

SECTION A

TRAVERSING BLADE-ROTARY PROPELLER

BACKGROUND OF THE INVENTION

1. Field of the Invention

This invention relates to a traversing blade rotary propeller useful as a propulsion system for various types of boats and aircraft, or as a turbine actuatable by wind or water to produce power. In particular, it relates to a system which applies laterally acting forces upon a fluid to produce propulsion; this action being similar to that produced by the caudal fins of fishes and the flukes of whales.

2. Background and Prior Art

Conventional propellers trace their origin to Archimedes of Syracuse, that extraordinary Greek mathematician, physicist, and inventor who lived in the second century, B.C. Archimedes is regarded as having perfected the principle of the rotating screw for use as a water pump in draining sunken ships. In his pump, a continuous screw or helix was rotated inside a cylinder. Two things happened: first, the desired effect—the screw pushed against the water, and moved it along. A second observed effect: the water resisted this pressure and pushed back. Many centuries later this second phenomenon was adopted to the movement of screwlike surfaces through another fluid; air. The Archimedes screw, or propeller, is now widely used as a propulsion system for a variety of boats and aircraft.

OBJECTS

It is a primary objective of the present invention to provide a novel traversing blade rotary propeller useful for the application of laterally acting forces upon a fluid medium to produce propulsion of a craft, or when acted thereon by wind or water to function as a fluid actuated turbine.

REFERENCE TO THE FIGURES

In the drawings:

FIGS. 9-11 and 13 depict in perspective.

SUMMARY OF THE INVENTION

The traversing blade-rotary propulsion system employs laterally acting forces similar to the action of the caudal fin of fish and the flukes of whales. Traversing blades of this system of propulsion however, do not reciprocate. Instead, their axes travel along a continuous circular path about a center of rotation.

In contrast to the conventional Archimedian screw-type propellers, in the traversing blade-rotary system the propeller blade sweeps across a swath (the diameter of the propeller) like the fin of a fish. Like propulsion in fish, the traversing blade-rotary propeller employs a lateral force as opposed to the longitudinal or radial force of the screw propeller. These properties in the traversing blade-rotary may provide basic advantages in pitch uniformity and in streamlining of propulsion.

Figure 6:
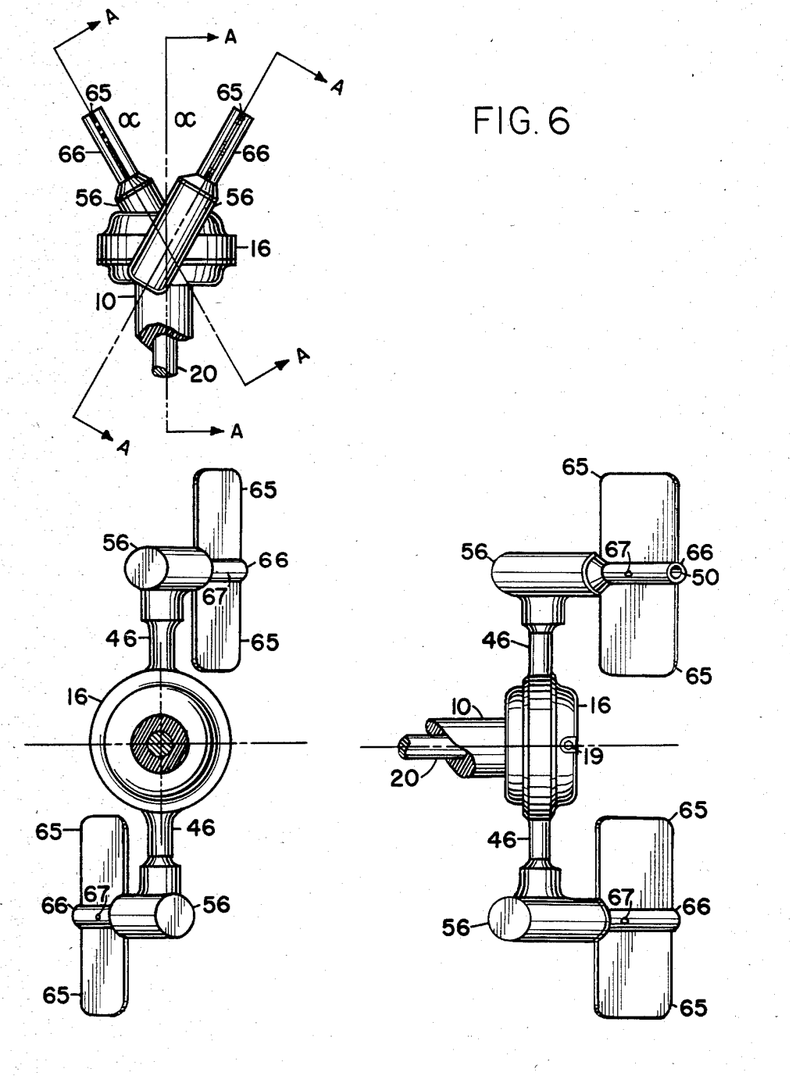
FIG. 6 illustrates a series of views in perspective depicting the major components of the traversing blade rotary propeller.

The mechanisms for achieving the traversing feature on a rotary device involve two basic principles. First, propeller blade shafts which serve as the mounts for the propeller blades are deflected to form an angle with respect to the central or main shaft. This angle of deflection for the propeller blade shafts is designated as angle alpha ($\alpha$), and is described in the Section on propeller geometry. Second, to accomplish the requirement that all propeller blades remain oriented either vertically or horizontally, shafts must turn in a direction counter to that of the central or main shaft and to the same degree. That is for example, if the central shaft makes one clockwise turn, each blade shaft must turn on counterclockwise turn. In other words, the central and blade shafts must be connected in a 1:1 ratio and in opposite directions of rotation. Refer to table 1 and to FIG. 6 for the identification of parts.

Some of the interesting properties and features of the traversing blade-rotary propeller involves the strictly vertical or strictly horizontal orientation of blades, streamlining of movement, a wide range of $\alpha$ angles, and a fairly uniform blade pitch at all positions of blade shafts along their circular paths.

Vertical or horizontal orientation of propeller blades simply means that each blade remains either vertical as in the caudal fin of a fish or horizontal as in the flukes of a whale. Only these two orientations are recommended and the choice between these two planes would depend upon the particular propeller application. For a given propeller, either all the blades must be vertical or all must be horizontal. In the discussion which follows, the vertical orientation will be generally considered. The vertical blade feature of the propeller has influence on the streamlining of movement and is necessary for the principle of traversion.

Since the movement of the propeller blades involves vertical orientation and traversing movements and since these are also features in the propulsion in fish, then the traversing blade-rotary can be expected to share the streamlined motion of fish propulsion. Intuitively, we can visualize that a propeller blade moving in a vertical orientation in water will not churn the water or cause disturbance in the water medium.

Theoretically, the angle $\alpha$ has a range from zero to 90 degrees. The effect of varying angle $\alpha$ on propeller pitch is shown in tables 2 through 14. The particular angle $\alpha$ chosen for a propeller will depend upon the particular application, and on whether speed or power is desired.

Figure 5:
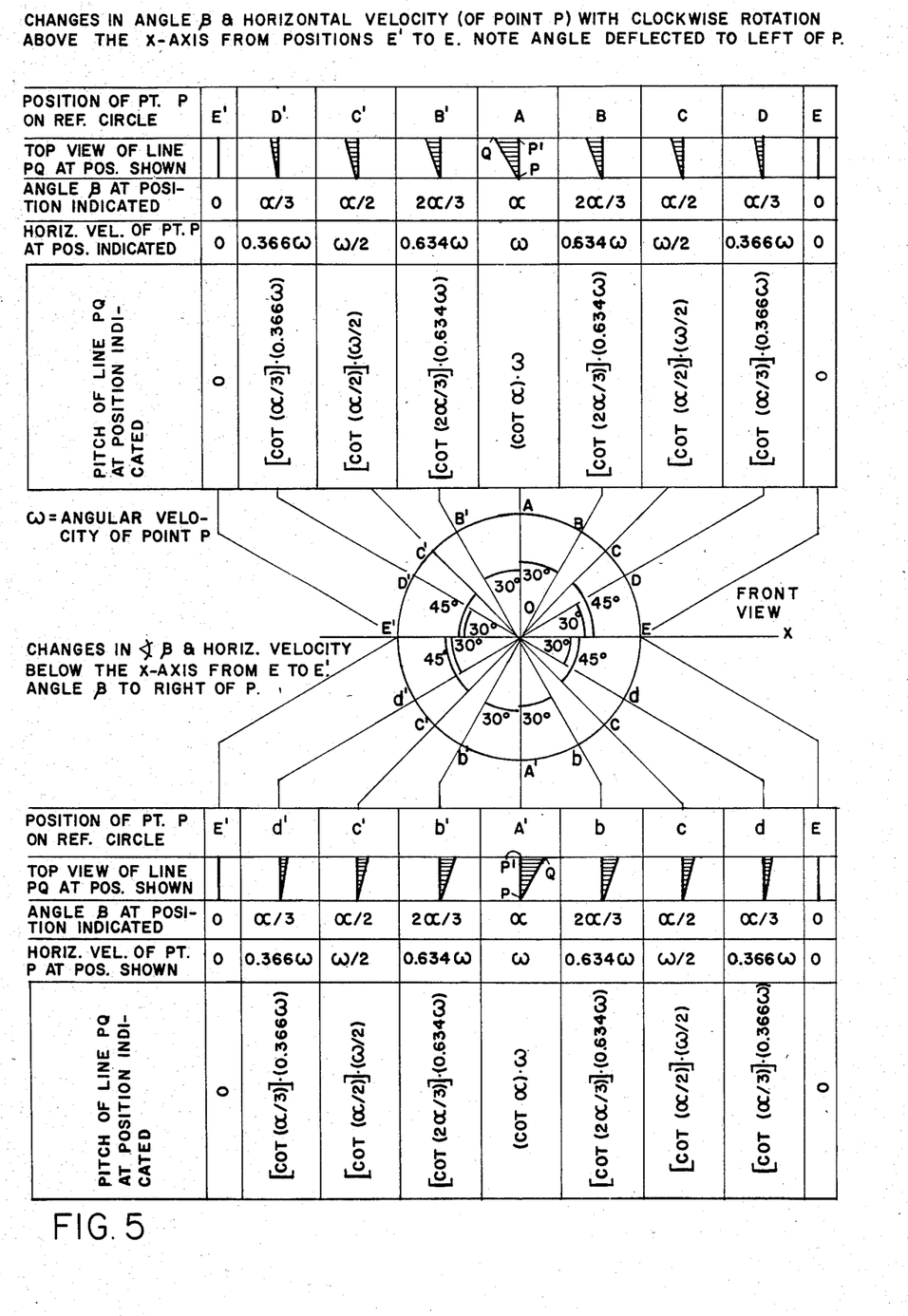

Pitch uniformity is shown in FIG. 5 and in tables 2 through 14. The uniformity in pitch through a complete cycle of rotation except for the zero deflection at the ends of a swath, is one of the strong features of the traversing blade-rotary propeller, which should provide a high efficiency of operation.

GEOMETRY OF PROPELLER STRUCTURE

A. ANGLE ALPHA

Figure 1:
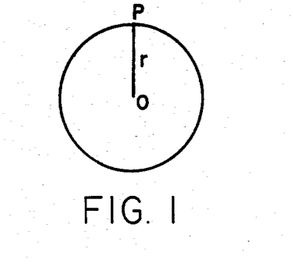
FIGS. 1 through 5 schematically depict the principles involved in the design, construction and operation of a traversing blade rotary propeller as employed in the practice of this invention.
Figure 2:
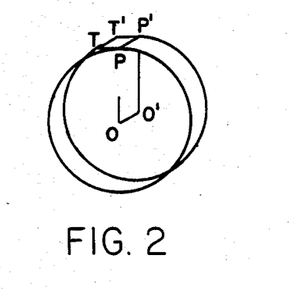
Figure 3:
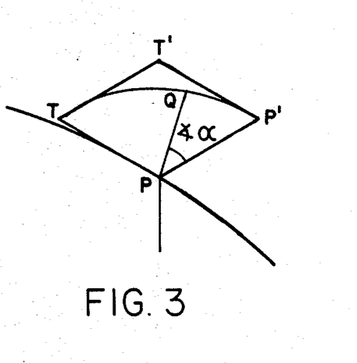

Suppose a point P is located on the circumference of a circle along the y-axis at a distance r from the center O. And, suppose a point P' is located at a distance S from point P along the y-axis on the circumference of a second circle at a distance r from center O'. Line PP' forms a cylinder when rotated about the center line OO', FIGS. 1 and 2. Then, if tangent lines from points P and P' are drawn to points T at a distance S from P and T' at a distance S from P', a quadrangle with vertices P,T,T' and P' is formed with the four points in a single plane. If then an arc is drawn as shown in FIG. 3 with center at P and length $\overline{PT}$ or S and if Q is located at any point along the arc, the angle QPP' is designated angle alpha ($\alpha$).

B. LINE PQ

Figure 4:
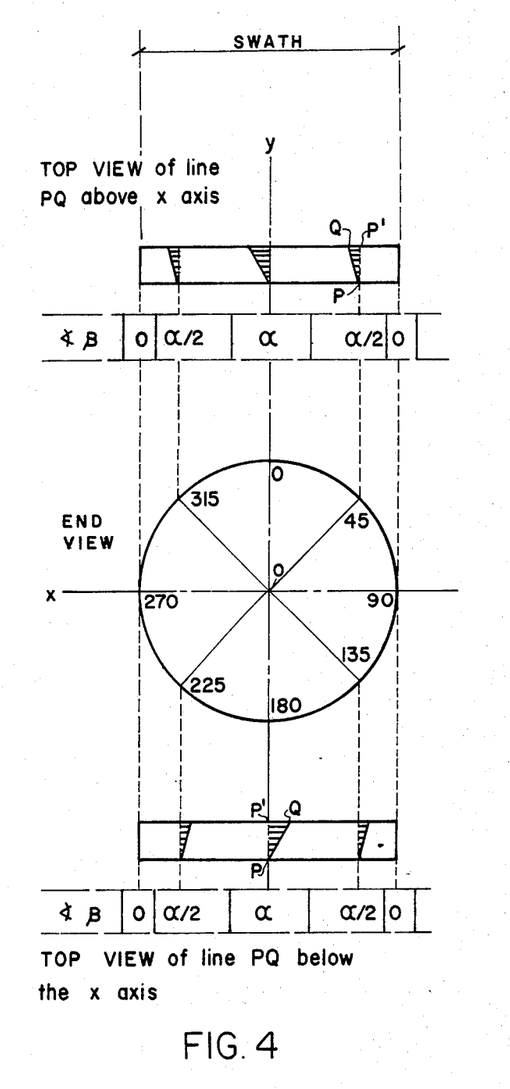

If line PQ is deflected to the left of point P' as shown in FIG. 4, and point P or line PQ is rotated about the center O in a clockwise direction, then line PQ is deflected to the left of point P' in the first quadrant. When P is on the x-axis at 90 degrees from the starting point indicated on the circle (FIG. 4), line PQ is deflected directly above point P'. As P is revolved along the circumference of the circle below the x-axis, line PQ is deflected to the right of point P'. And when P is located on the x-axis at 270 degrees as illustrated in FIG. 4, line PQ is deflected directly below point P'. As point P is moved above the x-axis from 270 degrees to the starting point, line PQ is again deflected to the left of point P'. Line PQ then is deflected to the left of point P' above the x-axis and to the right of point P' below the x-axis, and line PQ has no horizontal deflection when point P is on the x-axis.

C. ANGLE BETA

Angle $\alpha$ is observed along a radial line or a line intersecting the origin (O), and for a given $\alpha$ angle, the degree of the angle is constant regardless of the location of point P on the circumference of the circle, FIG. 5. The circle with points established in FIG. 5 will be referred to as the reference circle in the discussion which follows. If the line PQ is observed from the top as shown in FIGS. 4 and 5 along lines parallel to the y-axis instead of along a radial line, the deflection angle observed between lines PQ and PP' changes as the point P is moved along the circumference. This deflection angle observed from the top is zero (no deflection) when P is on the x-axis and gradually increases to a maximum equal to $\alpha$ when P is on the y-axis. This angle between line PQ and PP', angle QPP' varies with respect to the position of P on the reference circle when viewed from the top of the circle along lines parallel to the y-axis, and is designated as angle beta ($\beta$). Note that at the 45-degree angles from the x or y axis, angle $\beta$ is equal to angle $\alpha/2$, FIG. 4 (45, 135, 225 and 315-degree positions). When point P is on the x-axis, angle $\beta=0$. Angle $\beta$ is deflected to the left to point P' when point P is above the x-axis and to the right of point P' when P is below the x-axis. FIG. 5 shows additional values for angle $\beta$. When point P is 30 degrees from the x-axis, $\beta=\alpha/3$. When point P is 60 degrees from the x-axis or 30 degrees from the y-axis, $\beta=2\alpha/3$.

D. HORIZONTAL VELOCITY OF POINT P OR OF LINE PQ

Suppose we designate theta ($\phi$) as the smallest angle with vertex at the origin, formed between the x-axis and a position on the circumference of the reference circle. Then $\phi$ is 30 degrees for angle DOE, 45 degrees for angle COE, 60 degrees for angle BOE, and 90 degrees for angle AOE. If a point P is moving along the circumference of the reference circle at a uniform angular velocity, the horizontal velocity of point P is not uniform. When point P is on the y-axis either at positions A or A', a tangent line drawn on the reference circle, FIG. 5, at that point is perfectly horizontal. Therefore, the horizontal velocity ($V_h$) for a point P on the y-axis (A or A') is equal to the angular velocity ($\omega$). When point P is at A or A', $V_h=\omega$. When point P is on the x-axis, a tangent line drawn to the circle through point P (positions E or E') is perfectly vertical. Therefore, at the x-axis (positions E and E'), $V_h=0$. When angle $\phi$ is 45 degrees or when point P is at position C, a tangent line to point C has a 45-degree slope and point P at that instant along the reference circle is moving one horizontal unit to one vertical unit. Logically then, when angle $\phi=45$ degrees, $V_h=\omega/2$. In order to determine the instantaneous horizontal velocity of a point at any position on the circle, we must determine the horizontal fraction of the total coordinate distance obtained from the slope of the tangent line at the position in question. The horizontal fraction is the horizontal component (h) divided by the sum of the horizontal and vertical (v) components or, $h/(h+v)$. So then, the horizontal fraction, $h/(h+v)$, for P at the y-axis is $1/(1+0)=1$, for P at the x-axis it is $0/(0+1)=0$, and for P when $\phi=45$ degrees the horizontal fraction is $1/(1+1)=1/2$. Now, if we consider P at position D ($\phi=30$ degrees), a tangent line on the reference circle drawn through point D forms a 60-degree angle with the x-axis. If the point of intersection of the tangent line with the x-axis be $i_1$, and the point of intersection of the tangent line with the y-axis $i_2$, then the distance from the origin (O) to point $i_1$ is the h or x component and the distance from O to $i_2$ is the v or y component. If we designate angle $Di_1O$ as angle phi ($\theta$), then the h or x component is equal to the cosine $\theta$ ($\cos \theta$), and the v or y component is equal to the sine $\theta$ ($\sin \theta$). So then the horizontal fraction or horizontal velocity as a function of the angular velocity ($h/h+v$) at any point on the reference circle is equal to, $$V_h = \{\cos \theta/(\cos \theta + \sin \theta)\}\omega$$

but since angle $\theta$ will always be an angle complimentary to the $\phi$ angle for a given point on the reference circle, then it is easier to get the horizontal velocity more directly as, $$V_h = \{\sin \phi/(\sin \phi + \cos \phi)\}\omega.$$

From the above equation, we can determine that when $\phi=30$ degrees $V_h=0.366\omega$ and when $\phi=60$ degrees, $V_h=0.634\omega$.

E. THE PITCH OF LINE PQ

The distance moved forward as measured along line PP' or OO' as point P moves along line PQ for a given unit of horizontal motion will be regarded here as the pitch. The smaller the angle $\beta$, the greater the pitch or forward motion of point P. One of the components of the pitch then, is the cotangent of angle $\beta$. For the smaller angles to about 30 degrees, the cotangent of a half angle ($\alpha/2$) is approximately twice the numerical value of the cotangent of the angle ($\alpha$). This means that the pitch or forward projection of point P for $\alpha/2$ is approximately twice that for $\alpha$. However, as is shown in FIG. 5, at 45-degree positions (C positions) having a $\beta$ angle of $\alpha/2$, the horizontal velocity for those positions is half the angular velocity ($\omega/2$). This means that for a horizontal unit of distance traversed at the A or A' positions on the y-axis, twice the length of time will be required for that unit of horizontal distance to be traversed at the C positions. To explain this another way, the smaller angle ($\alpha/2$) projects P twice the distance of the larger angle, $\alpha$, but in twice the time since the horizontal velocity of P at the C positions is only one-half, $\omega/2$, that at the A positions, $\omega$. So then, per unit time the pitch of the point P is approximately the same at the C and the A positions on the reference circle. Since, as shown in FIG. 5, the angle $\beta$ decreases gradually from positions A to E which tends to increase the pitch, and since the horizontal velocity of P decreases to a nearly equal degree from the A to the E positions, the net effect is a tendency toward a uniformity in pitch. A fairly uniform pitch does occur throughout the entire swath except for the zero deflections at the edges of the swath (E positions). Tables 2 through 14 shows calculated pitch values for the positions indicated on the reference circle and for selected values of the angle $\alpha$. The pitch is more uniform at the smaller $\alpha$ angles.

DESCRIPTION OF THE PREFERRED EMBODIMENTS

A. GENERAL DESCRIPTION

The traversing blade-rotary propeller consists mainly of a central axis having radial arms which support the mountings for propeller blade shafts. See FIGS. 6,7,8,9, and 10.

The central propeller axis or center of the power shaft is represented by line OO' in section II on propeller geometry. The center of the propeller blade shafts is represented by line PQ. A top view of line PQ in FIG. 5 shows the plane of the propeller blades when oriented vertically. Refer to table 1 and FIG. 7 for identification of propeller parts.

Figure 7:
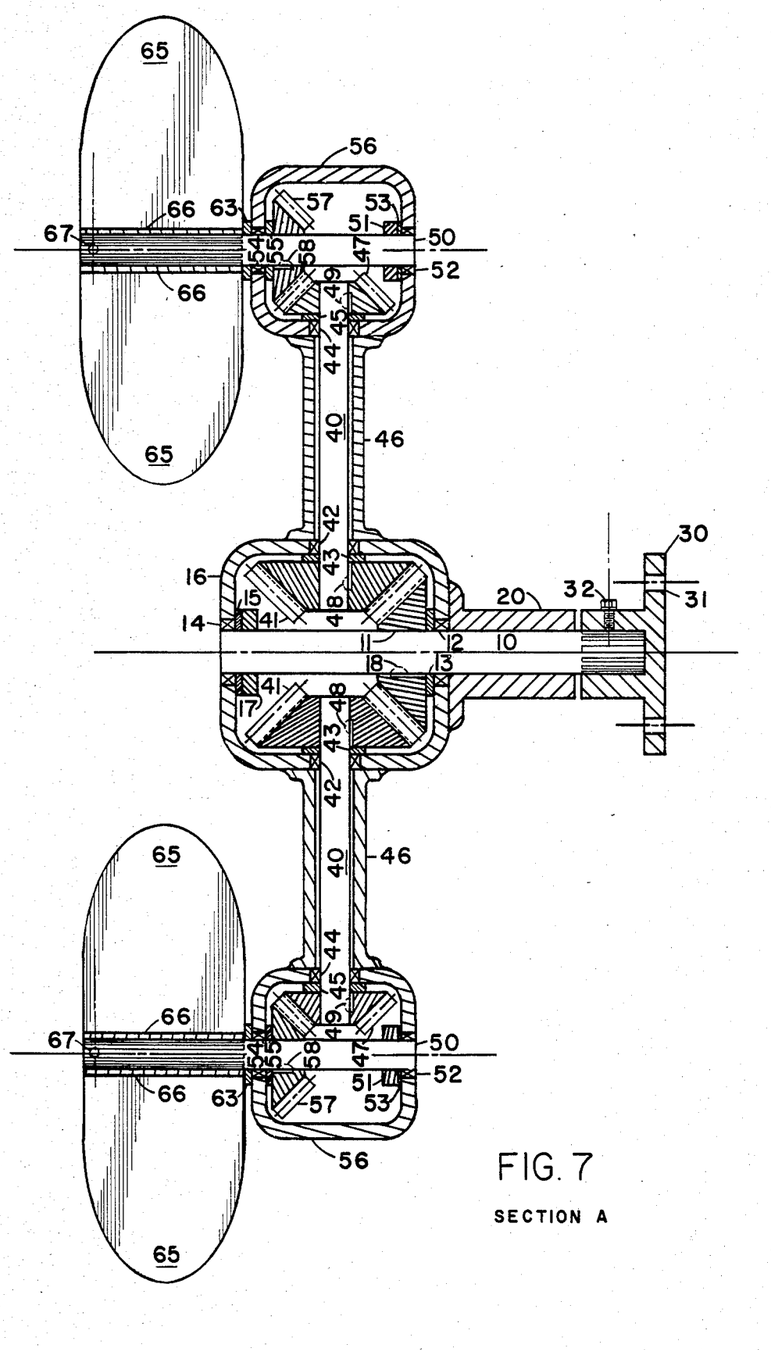
FIG. 7 depicts in detail, essentially completely in section, a preferred type of traversing blade rotary propeller; inclusive of major components and minor features.
Figure 8:
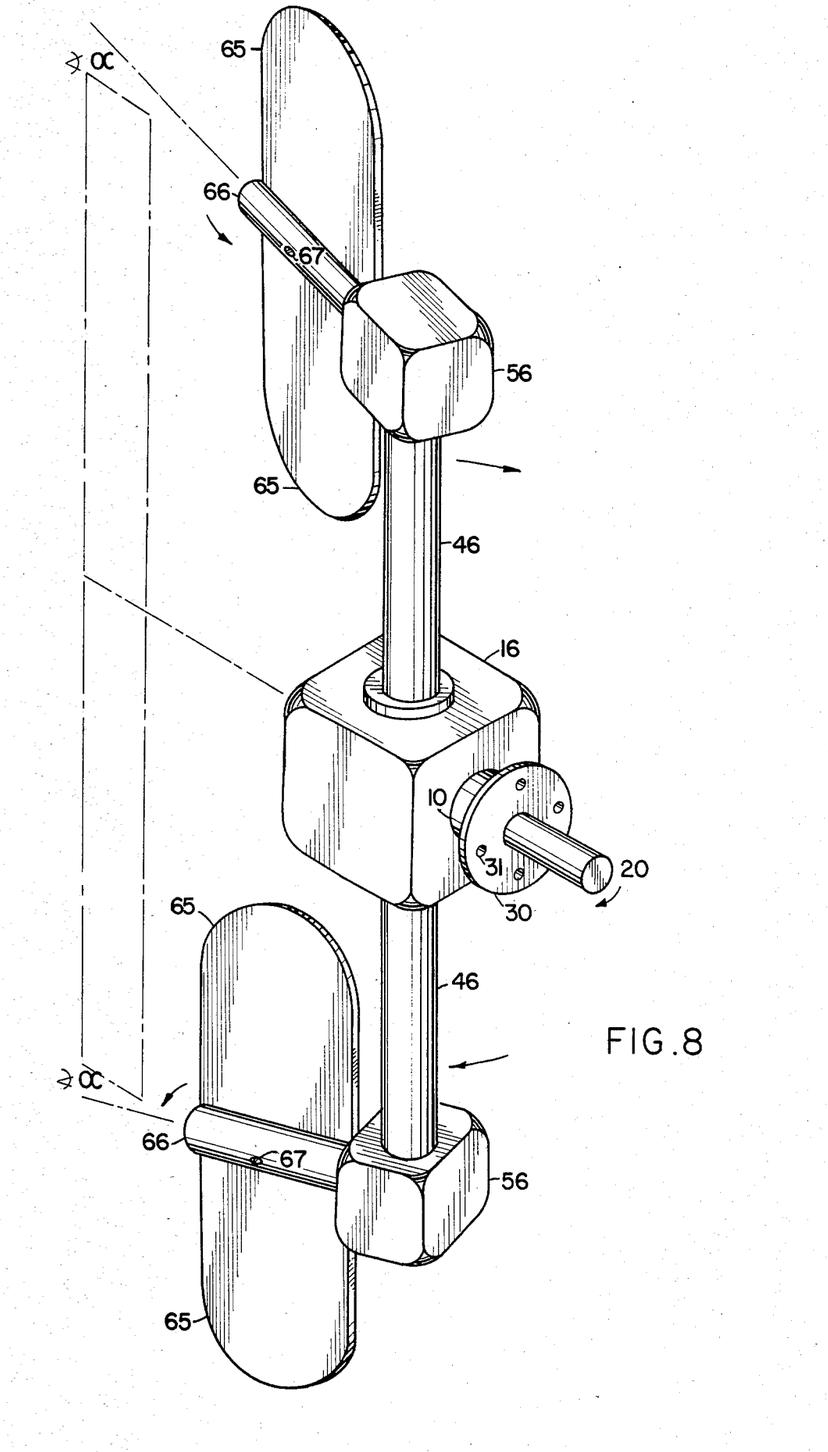
FIG. 8 depicts in perspective the device detailed in FIG. 7.
Figure 9:
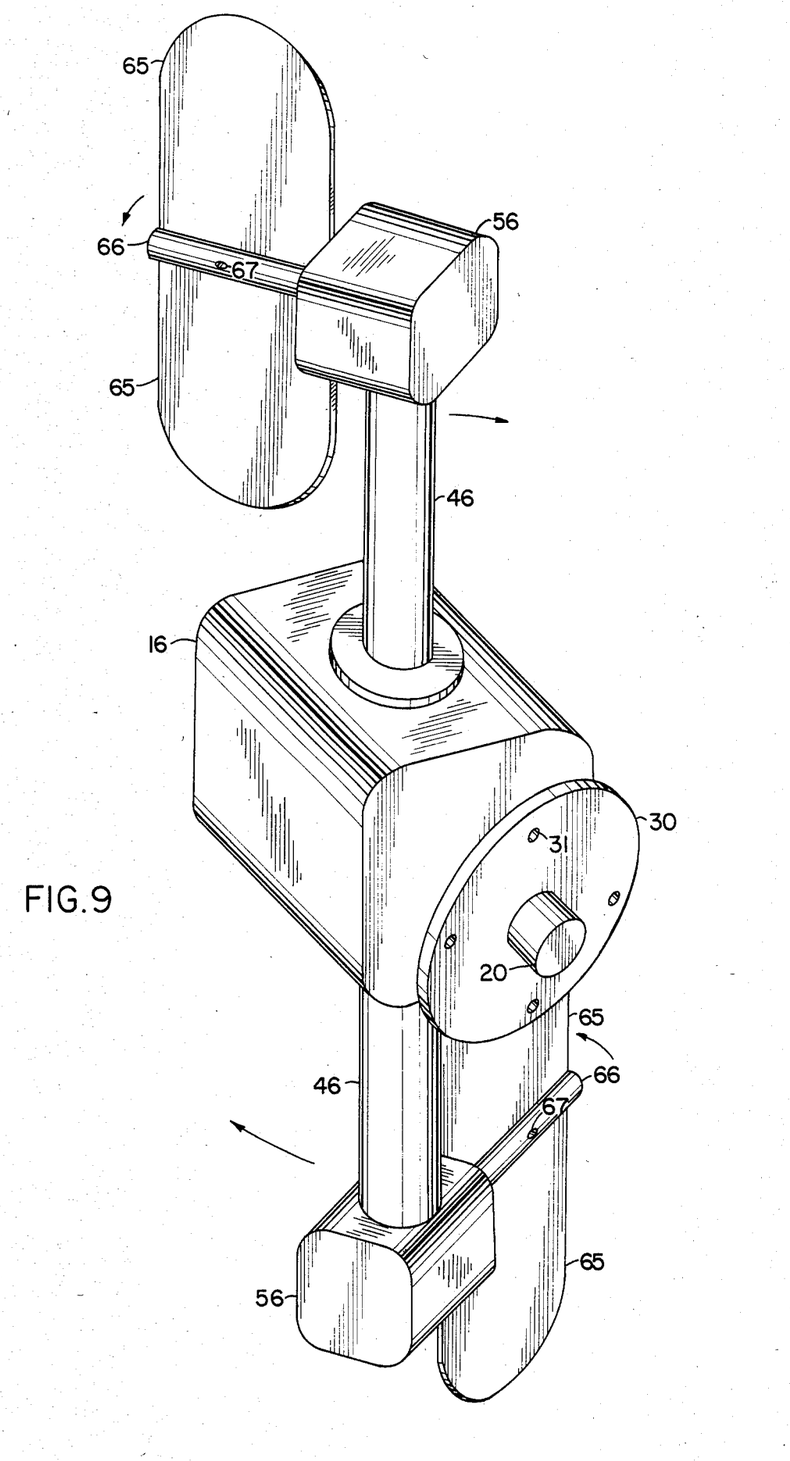
Figure 10:
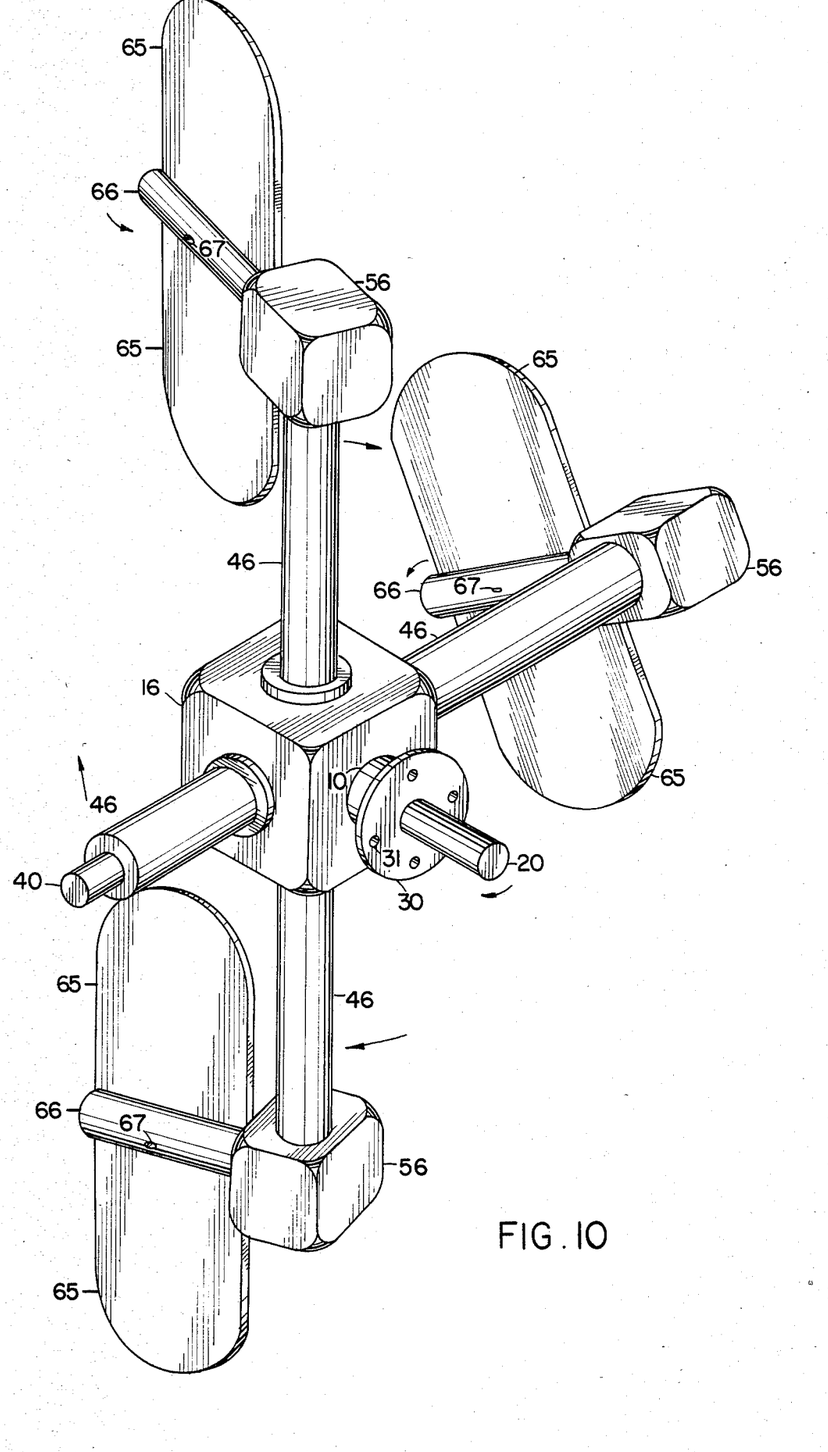
Figure 12:
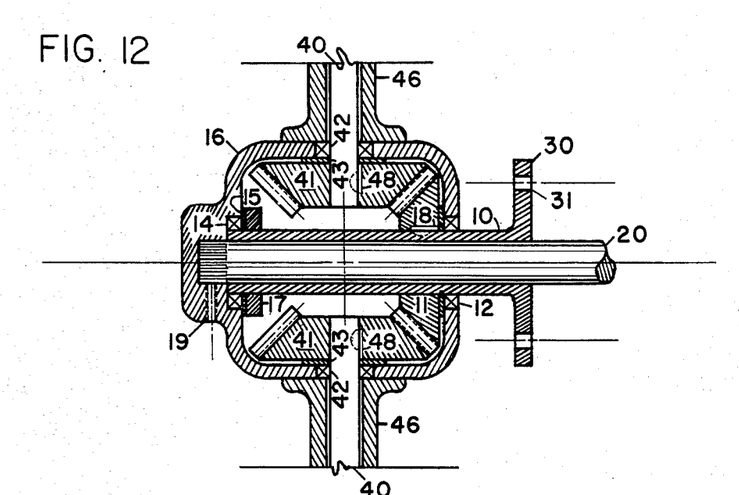
FIG. 12 depicts in section, various modifications of the traversing blade rotary propeller.

The blade shafts support the propeller blades involved in propulsion. The central axis consists of two major parts: (1) the stationary shaft, to which the mounting plate is attached, and (2) the power shaft, which is connected to the central gear housing and radial arms, and which turns and powers the propeller. The power shaft may be cylindrical and oriented outside of the stationary shaft and mount as shown in FIG. 7, or the power shaft may be oriented inside of a stationary cylinder and mount as shown in FIG. 12.

The propeller blade shafts are deflected the desired angle $\alpha$, as shown in FIGS. 6,8,9, and 10 to achieve the appropriate pitch for the propeller. The nature of the $\alpha$ angle is discussed in section II A on page 3. A small $\alpha$ angle should be used when high speeds are required, such as for aircraft propellers. Alpha angles for aircraft propellers could probably range from 5 to 15 degrees. For boat propellers, depending on whether power or speed is desired, $\alpha$ angles of from 15 to 30 degrees would probably be best suited. For wind turbines adapted to low wind speeds, very large $\alpha$ angles of approximately 70 to 80 degrees should result in fast turbine shaft speeds even at low wind speeds. The propeller blades are all oriented vertically in contrast to the radially fixed blade of the screw-type propeller. The drawings all show a vertical blade orientation, alternately the blades can be oriented in a horizontal plane which may be an advantage in certain applications. In one revolution about the central axis, each propeller blade traverses twice across a swath that is of the same width as the diameter of the propeller. The propeller blades traverse or sweep across the swath in one direction above the center of propeller rotation and in the opposite direction when traversing below the center of propeller rotation. For forward propulsion the angle of deflection on the blades is to the side opposite to the direction of traversion, and the deflection angle of the blades is to the same side as the direction of traversion for propulsion in the reversed direction, see FIG. 5. The diameter of the propeller is twice the distance center-to-center between the central axis and the propeller blade shaft. If two blades shafts are 180 degrees apart, the distance center-to-center between these is also the diameter of the propeller.

Structurally the most comlex portion of the propeller involves the parts having to do with the control of blades in a vertical orientation. In order to maintain the propeller blades vertically, the blade shafts must turn continuously in a direction opposite to that of the power shaft in a 1:1 ratio. The control mechanism presented in the drawings and this description employ geared shafts mounted inside the radial arms which interconnect the propeller blade shafts to the stationary gear. It is the spacially fixed, stationary gear which controls through the gear system, the continuous vertical orientation of the propeller blades.

B. DETAILED DESCRIPTION

There are five major parts with associated smaller parts making up the functional traversing blade-rotary propeller. These are the stationary shaft numbered 10 on the drawings, the power shaft (#20), the propeller mount (#30), the radial shaft (#40), and the propeller blade shaft (#50). Each of the major parts cited in the previous paragraph has associated functional parts which will be described in greater detail. First, the stationary shaft has the function of supporting the entire propeller and to provide orientation or polarity for the control of the vertical orientation of the propeller blades. The stationary shaft is shown with a splined end in FIG. 7 along with a lock nut to secure it to the mount (#30). Alternately, a cylinder may be used which is in one piece with the propeller mount as shown in FIGS. 6,8,9,10,12 and 13, and which has the same function as the stationary shaft. Two bearings, a front bearing (#12) and a rear bearing (#14), prevent friction between the stationary shaft or cylinder and the rotating central gear housing (#16), as shown in FIGS. 7 and 12. The stationary gear (#11) functions in controlling the orientation of the propeller blades vertically. The spacers, front and rear (#'s 13 & 15), prevent contact between housing and gear, or housing and collar, respectively. The stationary shaft collar (#17), keeps the stationary shaft from moving with respect to the central gear housing (#16). The central gear housing functions in securing shafts in their proper positions and also contains lubricant for the moving parts inside. The stationary gear key (#18), keeps the stationary gear from moving on the stationary shaft.

The power shaft (#20), is connected to the central gear housing. The connection between the power shaft and central gear housing might utilize a splined end on the shaft fitting into the housing as shown in FIG. 12, along with a threaded opening (#19) for a screw to tighten the shaft onto the housing. Alternately, if the power shaft is cylindrical, fitting over a solid stationary shaft as shown in FIG. 7, the two parts could be joined by welding or with bolts. In either case, the power is not transmitted directly through the gear system. Although forces are exerted on the gear system, the main function of the gears is to maintain the vertical orientation of the propeller blades.

The propeller mount is either secured to the stationary shaft as illustrated in FIG. 7 by a splined fitting and a threaded opening (#32) for a locking nut, or may be an integral part of the stationary cylinder as in FIGS. 6,8,9,10,12, and 13. Drilled openings (#31) are shown in FIGS. 7 and 12 for mounting to the craft. The design for the mounting, however, would depend upon the particular application for the propeller.

The radial arm shafts (#40), FIG. 7, which maintain the the orientation of the blade shafts by an interconnection of blade shafts to the stationary gear are free to move inside of the radial arm sleeves (#46). The radial arm sleeves are connected at one end to the central gear housing (#16), and at the other end to the peripheral gear housing (#56). These connections could be either by welding these parts together or by bolting. The radial arm shafts have a bevel gear at each end, the radial arm central gear (#41) which meshes with the stationary gear, and the radial arm peripheral gear (#47) which meshes with the blade shaft gear (#57). Two bearings located one on each end, support the radial arm shaft. These are the radial arm central bearing (#42) and the radial arm peripheral bearing (#44). These bearings should have oil seals in propeller applications requiring high RPM's in order to avoid slinging of oil away from the central gear housing. Two spacers are placed between the gears and gear housings on the radial shafts (#'s 43 and 45). Two keyways, one on each end of the shaft with the matching key (#'s 48 and 49) secure the gears to the shaft.

The propeller blade shafts (#50) is mounted in the peripheral gear housing (#56). The propeller blade shaft is mounted perpendicular to the radial arm shaft in the peripheral gear housing and not parallel to the central axis. The angle of deflection between the center line of the propeller blade shaft and the central axis is referred to as angle α. Refer to the section II A for information concerning other properties of the α angle. All blade shafts for a given propeller are deflected to the same side and to the same degree from a given position of observation. For example, the deflection as observed from the A position at the y-axis as shown in the reference circle in FIG. 5. Two bearings with seals (#'s 52 and 54) support the propeller blade shaft. Two spacers (#'s 53 and 55) keep the collar (#51) and the blade gear (#57) from contacting with the peripheral gear housing. A keyway in the blade shaft gear and propeller blade shaft with matching key (#58) secures the blade shaft gear on the propeller blade shaft. The blade shaft collar (#51) is also secured to the propeller blade shaft by a locking nut.

The propeller blade (#65), is welded to the propeller blade sleeve (#66) which is in turn secured to the propeller blade shaft. FIG. 7 shows the end of the blade shaft splined to secure the blade sleeve. Depending upon the application for the propeller, securing the blade sleeve to the blade shaft could be accomplished by splining of shaft and sleeve or by use of keys. A threaded opening (#67) with locking nut should also be provided to prevent the blade sleeve from sliding backward and forward on the blade shaft. A spacer or space (#63) is provided between the blade and blade gear housing.

C. VARIATIONS IN PROPELLER STRUCTURE AND FUNCTION i. Type of Control Mechanism for Maintaining Blade Orientation

In all of the descriptions given in this presentation, a bevel gear system is considered to control the orientation of the propeller blades either vertically or horizontally. In high speed applications requiring a large amount of power, this is probably the most practical design, but in certain applications, chain-and-sprocket or timing belt designs may be advantageous. For wind turbines, for example, chains and sprockets should work well. Any conventional timing system or power-transmitting system could conceivably be employed depending upon the particular application for the propeller. The basic requirement is that the propeller blade shafts must turn to the same degree and in a direction opposite to that of the power shaft.

(ii) Orientation of Propeller Blades

Basically, two planes of blade orientation are thought to be practical. These are the vertical and horizontal planes. any other plane could be used, but would not seem to be of particular advantage. The vertical orientation is shown in all of the drawings. For the horizontal orientation, the α angle has a maximum value at the x-axis and a zero deflection at the y-axis.

(iii) Number of Blades Per Blade Shaft

Figure 11:
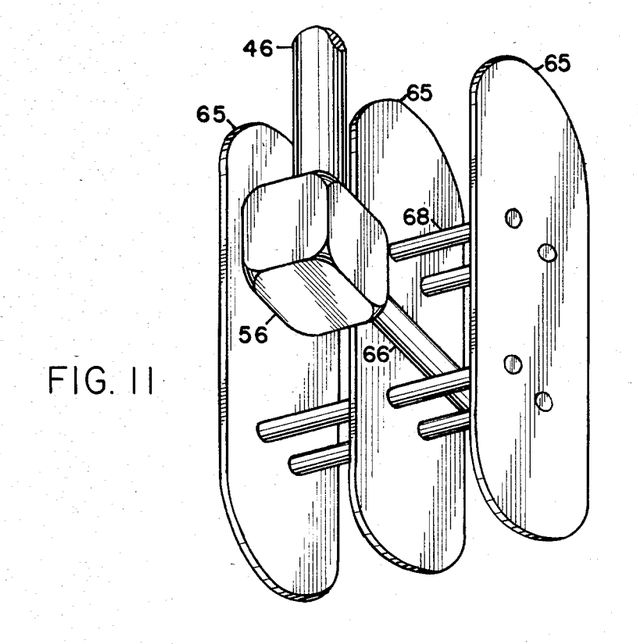

One propeller blade can be installed on each blade shaft as illustrated in FIGS. 6, 7, 8, 9, and 10. This single-blade design is probably the most practical for use in airplane and marine propellers, but multiple blades can be installed when a larger surface area of contact with the medium is desired, such as for use in wind turbines or water turbines. In FIG. 11 is shown a multiple blade design with the blades in parallel arrangement, and in FIG. 13, a tandem arrangement of blades is shown. It should be noted that the tandem arrangement is especially interesting since this design would remove twisting forces on the radial arm. In the tandem arrangement, the two blades cause a twisting in opposing directions, therefore, if the two blades on one shaft are of equal surface area, their individual twisting forces will be negated or balanced.

(iv) Direction of the Deflection Angle Alpha

Viewing from the front as in FIGS. 1 through 5, the angle of deflection α, can be to the left as illustrated in FIGS. 4 and 5 in which case a clockwise rotation of the central axis will propel forward. Alternately, the perller shafts may be deflected to the right in which case a counterclockwise rotation of the power shaft would result in a forward propulsion. Propelling backwards is accomplished by rotating the power shaft in a direction opposite to that for forward propulsion. The traversing blade-rotary propeller can be placed in front of a craft for pulling or to the rear for pushing.

(v) Variation in the Number of Blade Shafts and Radial Arms

For propulsion, such as for marine or airplane propulsion, the two propeller-blade-shaft design illustrated in FIGS. 6, 7, 8, 9, and 13, would seem the most practical at least from the standpoint of a more simple construction. However, this two blade-shafts design will probably not work in wind or water turbine applications, because the two blades of a pair at 180 degrees will have a zero deflection at the ends of the swath. With the blades oriented vertically, that would happen when the radial arms are in the horizontal position. For wind, water, and water-wave turbines, therefore, the four radial-arm design shown in FIG. 10 should be used. With this design, when one pair of propeller blades is at zero deflection, the other pair will be acted upon by the wind. In other words, the four blades are never at zero deflection all at the same time. It is possible that a three-bladed design (not shown) with radial arms at 120 degrees apart might be practical for both propulsion and turbine use. The only possible disadvantage with a three-bladed design is the difficulty of balancing forces about the central axis.

IV. SPECIAL APPLICATIONS

A. MARINE

Generally, smaller diameters and fairly large $\alpha$ angles will be required for marine propellers. The particular $\alpha$ angle and propeller diameter would depend upon the use of the propeller and whether speed or power is desired. For small boats $\alpha$ angles of 30 degrees should be practical. The advance per revolution for the traversing blade-rotary can be obtained from the product of the following factors: (1) the cotangent of the $\alpha$ angle, (2) 2 (traversions per revolution), and (3) the propeller diameter.

B. AIRPLANE

For airplane propellers, a horizontal blade orientation would be desirable, since that design would require the central axis or power shaft to be only the distance of the radius of the propeller from the ground. To obtain the advance per revolution with an airplane propeller, the same relation would hold as for marine propellers explained above. Smaller $\alpha$ angles and larger propeller diameters, however, would be possible with airplane propellers, both of which would contribute to a larger advance. In addition, higher RPM's should be possible with airplane propellers. If we consider a 15-degree $\alpha$ angle on a 6-foot diameter propeller, the advance per revolution would be 44.8 feet. At 500 RPM's, this gives a speed of 254 miles per hour. Higher RPM's, smaller $\alpha$ angles, larger propeller diameters, and possibly incorporation of the air foil principle to this type of propeller are factors which would increase the potential for higher speeds.

C. HELICOPTER LIFT AND FORWARD PROPELLER

One requirement for the helicopter lift and forward propeller is that the central axis or power shaft must be vertically oriented. The blade orientation can be either vertical or horizontal. A variable pitch feature would be necessary for this type of application which has not been described in this application, but which is mechanically possible. The large diameters used for helicopter propellers would be advantageous for a traversing blade-rotary propeller.

D. WIND TURBINES

With wind turbines, one of the main problems is the difficulty of capturing energy at low wind velocities. In order to obtain high rates of rotation at low wind velocities with the traversing blade-rotary, a large $\alpha$ angle and a relatively small propeller diameter are required. The relationship for obtaining the rate of rotation (RPM's) for a wind turbine of the traversing blade-rotary type is as follows:

$$RPM's = \frac{\text{Wind Velocity in Feet Per Minute}}{(\text{Cot } \alpha)(2 \text{ trav./Rev.})(\text{Prop. Dia.})}$$

Figure 13:
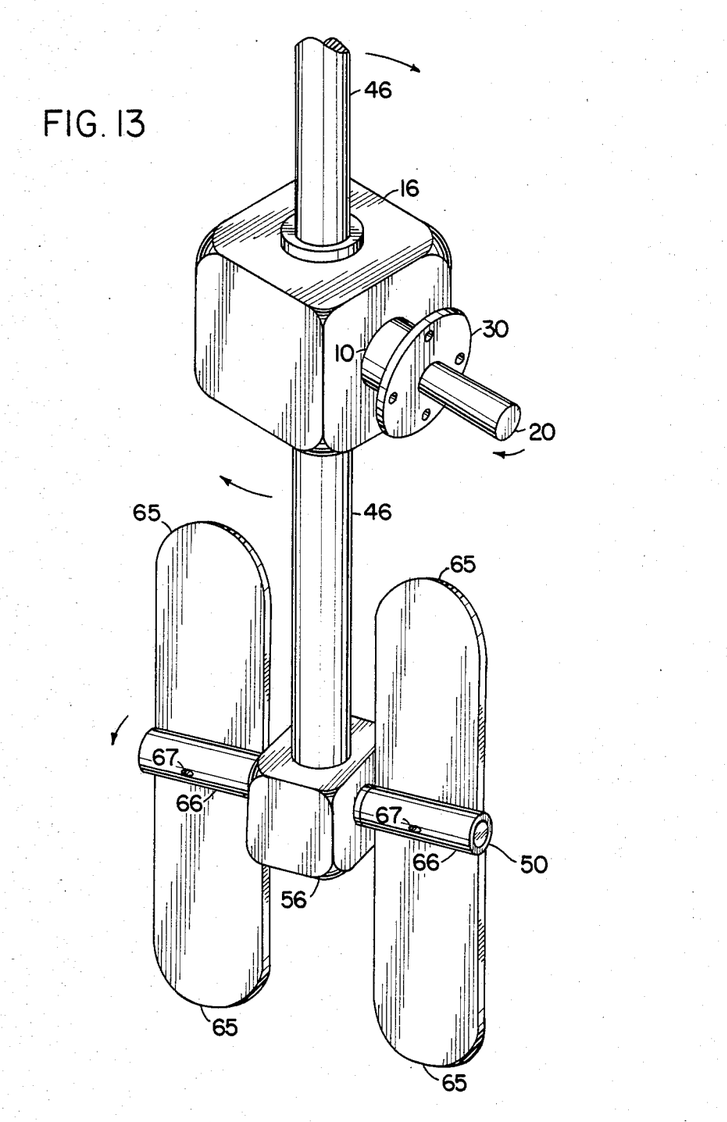

According to this relation, a 3-foot diameter propeller with a 60-degree $\alpha$ would turn at 51 RPM's in a 2-mile-per-hour wind. A 10-foot diameter propeller with a 50-degree $\alpha$ angle would turn at 26 RPM's in a 5-mile-per hour wind. Larger surface areas for capturing more of the wind's energy can be accomplished by using multiple blades per blade shaft as illustrated in FIGS. 11 and 13.

E. WATER AND WATER-WAVE TURBINE

The same relation as for wind turbines holds for the rate of rotation in water and water-wave turbines.

V. DISCUSSION OF PARTICULAR FEATURES OF THE INVENTION

A. PRINCIPLES (i) Special Case: Unit Radial Arm, Beveled Gears, And Vertical Blade The main groups of functional parts in the traversing blade-rotary propulsion system involves three axes or centers of rotation. These are (1) the central axis which is the longitudinal center line of the power and stationary shafts, (2) the radial axis which is the center of rotation of the radial arm shaft, and (3) the peripheral axis which is the center of rotation of the propeller blade shaft.

The power shaft may fit inside of a stationary cylinder, or a stationary shaft may fit inside of a cylindrical rotating power source. In either case, their respective functions are the same. Both of these shafts are supported in the central gear housing.

The power shaft is secured to the central gear housing, the radial arm sleeve and the peripheral gear housing, such that all four parts rotate as a unit.

The stationary shaft is connected to the propeller mount and the stationary gear, and has the functions of supporting the entire propeller structure, as well as providing a base of polarity or orientation for the propeller blades. The radial arm shaft is perpendicular to the power shaft, and interconnects the propeller blade shaft and the stationary shaft through a beveled gear system.

In order to more easily describe the orientation of the propeller balde shaft, a system of three mutually perpendicular axes, the conventional Cartesian Coordinates, will be employed. These will be considered oriented with a vertical z-axis, a horizontal y-axis, and the x-axis perpendicular to the plane of observation or perpendicular to the plane of the paper. The center of power shaft rotation is assumed to coincide with the x-axis, and the center of rotation of the radial arm shaft is assumed to coincide with the vertical z-axis. Now, along the z-axis above the origin, O, or point of intersection of the coordinate axes, P is the point of intersection of the z-axis with the center of rotation of the propeller blade shaft. The distance $\overline{OP}$ is the radius of the propeller, the distance from the centers of the power and the propeller blade shafts. Of the points in the center line of rotation of the propeller blade shaft, only point P is in the xz-plane. All other points of that center line of the propeller blade shaft lies in a plane designated M, which is perpendicular to the xz-plane at point P. Now, point P' is located at a distance S from point P, on the side of P opposite from that of observation, and at the intersection of the xz-plane and the M-plane. If an arc is drawn in the M-plane with vertex at P through P' less than 90 degrees on either side of P', then Q is located at any point along the arc. Angle QPP' is designated as angle alpha ($\alpha$), and line PQ coincides with the center of rotation of the propeller blade shaft.

Suppose in an end view of the propeller blade shaft, a vertical line is drawn through the center, which intersects the circumference of the shaft both above and below the center. Now, the point of intersection above the center is marked U, and the point of intersection below the center is marked D. If the power shaft is now rotated one revolution turning the radial arm and propeller blade shaft along the circumference, and the marks on the end of the propeller blade shaft are observed at any point along the cycle of revolution, the mark U will always be above the center and the D mark will always be directly below the center of the propeller blade shaft. The propeller blade shaft then, is polarized, or always oriented in the same way in space. Since the propeller blade is afixed to the propeller blade shaft, such that it always lies in the plane of points P,Q,U and D, then the propeller blades are also polarized vertically.

The polarity or vertical orientation of the propeller blade shaft and propeller blade is controlled by linkage of the propeller blade shaft to the stationary shaft. This linkage through a system of beveled gears interconnected through the radial arm shaft, maintains the rotation of the power and the propeller blades shafts in a 1:1 ratio and in opposite directions.

Given the two properties of the $\alpha$ angle and polarity on the propeller blades, then the following characteristics of blade traversion occurs as the power shaft rotates and the propeller blade moves along the circumference. Starting with the propeller blade at point P on the z-axis and with deflection angle $\alpha$ to the left, clockwise rotation of the power shaft results in propulsion toward the observer. The angle of deflection decreases from point P to a zero deflection when the propeller blade is at the y-axis. This varying angle of deflection is designated as angle beta ($\beta$). Now, as the propeller blade moves along the circumference below the axis of rotation towards the z-axis, angle $\beta$ is to the right, and gradually increases to a maximum value equal to $\alpha$ at the z-axis. Propulsion is still in the direction of the observer. The z-axis is the center of traversion and the center of the swath. The swath is the distance of one traversion and is equal to the diameter of the propeller. As the propeller blade moves from the z-axis toward the y-axis on the left of the power shaft, the angle $\beta$ decreases gradually to a zero deflection. The y-axis is at the edge of the swath. As the propeller blade moves from the y-axis in the last quadrant back to the original starting point, the angle of deflection is again to the left and increases gradually to a value equal to $\alpha$ at point P. Propulsion in the last quadrant is still in the same direction toward the observer. For propulsion in the opposite direction, the power shaft is simply rotated counterclockwise. It might be noted, that for propulsion toward the observer, the deflection is always to the side opposite to the direction of horizontal traversion of the propeller blades. In propulsion away from the observer, the deflection of angle $\beta$ is on the same side as the direction of traversion. If clockwise rotation of the power shaft is assumed, then two traversions occur across the swath, a traversion to the right above the center of rotation and a traversion to the left below the center of rotation. Although the angle $\beta$ varies with the position of the propeller blade along the swath, the instantaneous or position pitch is fairly uniform across the swath because of the correcting influence of the variation in the horizontal velocity of blade movement across the swath. Information concerning angle $\beta$, horizontal velocity, and pitch is presented in the specifications, FIG. 5, and tables 2 through 14.

(ii) General Principle

Two of the most important features of the traversing blade-rotary propeller are the $\alpha$ angle and polarity or vertical blade orientation. A number of conventional means can be used to control propeller blade polarity besides the beveled gear system described above, including chain-and-sprocket, timing belt, and other types of gear systems. Virtually any system of power transmission can be used to accomplish the requirement of rotating the power and propeller blade shafts in opposite directions and in a 1:1 ratio.

The number of radial arms and propeller blade shafts can vary although the most practical numbers would probably be two, three or four. The number or arrangement of propeller blades per propeller blade shaft can be one or several. The arrangement may be in tandem or in parallel as explained in the specifications and figures.

The particular blade orientation or polarity can be vertical as described in the special case above, or horizontal. To obtain a horizontal orientation, all that is required is to rotate the entire propeller by the stationary shaft through 90 degrees. The swath is now vertical and traversions are up one side and down the other. Rotating the entire propeller by the propeller shaft 180 degrees simply inverts the propeller blades, the polarity remains vertical and the traversions remain horizontal. Now, any angle of blade polarity between the vertical and the horizontal can be obtained by simply rotating the entire propeller by the stationary shaft to that angle.

The central axis can be oriented in any angle, horizontal, vertical, or other, depending upon the requirement in the particular application.

The orientation of the power shaft with respect to the stationary shaft can also vary. Two designs are presented in the specifications and drawings.

The main emphasis with regard to the system of propulsion presented here is the function and the principle in its entirety. No mere rearrangement or reorientation of parts should be deemed novel.

B. APPLICATIONS

1. For Marine Propellers
2. For Airboat Propellers
3. For Airplane Propellers
4. For Helicopter Lift-and Forward Propellers
5. For Wind Turbines
6. For Water Turbines
7. For Water-Wave Turbines
8. For Cooling Fans

TABLE 1
TRAVERSING BLADE-ROTARY PARTS LIST IN NUMERICAL ORDER

| PART # | NAME |
|---|---|
| 10 | Stationary Shaft or Cylinder |
| 11 | Stationary Gear |
| 12 | Stationary Shaft, Front Bearing |
| 13 | Stationary Shaft, Front Spacer |
| 14 | Stationary Shaft, Rear Bearing |
| 15 | Stationary Shaft, Rear Spacer |
| 16 | Central Gear Housing |
| 17 | Stationary Shaft, Collar |
| 18 | Stationary Gear, Keyway & Key |
| 19 | Threaded Opening w/screw |
| 20 | Power Shaft or Cylinder |
| 30 | Propeller Mount |
| 31 | Drilled Opening |
| 32 | Threaded Opening w/screw |
| 40 | Radial Arm Shaft |
| 41 | Radial Arm, Central Gear |
| 42 | Radial Arm, Central Bearing |
| 43 | Radial Arm, Central Spacer |
| 44 | Radial Arm, Peripheral Bearing |
| 45 | Radial Arm, Peripheral Spacer |
| 46 | Radial Arm Sleeve |
| 47 | Radial Arm, Peripheral gear |
| 48 | Radial Arm, Central Keyway w/key |
| 49 | Radial Arm, Peripheral Keyway w/key |
| 50 | Propeller Blade Shaft |
| 51 | Blade Shaft, Collar |
| 52 | Blade Shaft, Front Bearing |
| 53 | Blade Shaft, Front Spacer |
| 54 | Blade Shaft, Rear Bearing |
| 55 | Blade Shaft, Rear Spacer |
| 56 | Peripheral Gear Housing |
| 57 | Blade Shaft, Gear |
| 58 | Blade Shaft, Keyway w/key |
| 63 | Blade/Gear Housing Spacer |
| 65 | Propeller Blade |
| 66 | Propeller Blade, Splined Sleeve |
| 67 | Threaded Opening w/screw |
| 68 | Connecting Bars for Parallel Blades |

TABLE 2
CALCULATED PITCH VALUES FOR THE INDICATED POSITIONS ON THE REFERENCE CIRCLE FOR $\alpha = 5$ DEGREES (Refer to FIG. 5)

| POSITION | A | B | C | D | E |
|---|---|---|---|---|---|
| ANGLE $\beta$ | 5 | 3.33 | 2.5 | 1.666 | 0 |
| COTANGENT $\beta$ | 11.430053 | 17.169337 | 22.903767 | 34.367774 | 0 |
| HORIZONTAL VELOCITY ($V_h$) $V_h$ as a function of the Angular Velocity | 1 | 0.634 | 0.5 | 0.366 | 0 |
| PITCH AT THE POSITION INDICATED PITCH = (COT $\beta$) ($V_h$) | 11.430053 | 10.88536 | 11.451883 | 12.578605 | 0 |

Percent Difference Between Extreme Pitch Values (Positions B & D) = 7.22%

TABLE 3
CALCULATED PITCH VALUES FOR THE INDICATED POSITIONS ON THE REFERENCE CIRCLE FOR $\alpha = 10$ DEGREES (Refer to FIG. 5)

| POSITION | A | B | C | D | E |
|---|---|---|---|---|---|
| ANGLE $\beta$ | 10 | 6.66 | 5 | 3.33 | 0 |
| COTANGENT $\beta$ | 5.6712819 | 8.5555471 | 11.430053 | 17.169337 | 0 |
| HORIZONTAL VELOCITY ($V_h$) $V_h$ as a function of the Angular Velocity | 1 | 0.634 | 0.5 | 0.366 | 0 |
| PITCH AT THE POSITION INDICATED PITCH = (COT $\beta$) ($V_h$) | 5.6712819 | 5.4242169 | 5.7150263 | 6.2839773 | 0 |

Percent Difference Between Extreme Pitch Values (Positions B & D) = 7.34%

TABLE 4
CALCULATED PITCH VALUES FOR THE INDICATED POSITIONS ON THE REFERENCE CIRCLE FOR $\alpha = 15$ DEGREES (Refer to FIG. 5)

| POSITION | A | B | C | D | E |
|---|---|---|---|---|---|
| ANGLE $\beta$ | 15 | 10 | 7.5 | 5 | 0 |
| COTANGENT $\beta$ | 3.7320508 | 5.6712819 | 7.5957541 | 11.430053 | 0 |
| HORIZONTAL VELOCITY ($V_h$) $V_h$ as a function of the Angular Velocity | 1 | 0.634 | 0.5 | 0.366 | 0 |
| PITCH AT THE POSITION INDICATED PITCH = (COT $\beta$) ($V_h$) | 3.7320508 | 3.5955927 | 3.7978771 | 4.1833994 | 0 |

Percent Difference Between Extreme Pitch Values (Positions B & D) = 7.56%

TABLE 5
CALCULATED PITCH VALUES FOR THE (COT POSITIONS ON THE REFERENCE CIRCLE FOR $\alpha = 20$ DEGREES (Refer to FIG. 5)

| POSITION | A | B | C | D | E |
|---|---|---|---|---|---|
| ANGLE $\beta$ | 20 | 3.33 | 10 | 6.66 | 0 |
| COTANGENT $\beta$ | 2.7474774 | 4.2193319 | 5.6712819 | 8.5555471 | 0 |
| HORIZONTAL VELOCITY ($V_h$) $V_h$ as a function of the Angular Velocity | 1 | 0.634 | 0.5 | 0.366 | 0 |
| PITCH AT THE POSITION INDICATED PITCH = (COT $\beta$) ($V_h$) | 2.7474774 | 2.6750564 | 2.835641 | 3.1313302 | 0 |

Percent Difference Between Extreme Pitch Values (Positions B & D) = 7.86%

TABLE 6
CALCULATED PITCH VALUES FOR THE INDICATED POSITIONS ON THE REFERENCE CIRCLE FOR $\alpha = 25$ DEGREES (Refer to FIG. 5)

| POSITION | A | B | C | D | E |
|---|---|---|---|---|---|
| ANGLE $\beta$ | 25 | 16.66 | 12.5 | 8.33 | 0 |
| COTANGENT $\beta$ | 2.1445069 | 3.3402328 | 4.5107085 | 6.8269438 | 0 |
| HORIZONTAL VELOCITY ($V_h$) $V_h$ as a function of the Angular Velocity | 1 | 0.634 | 0.5 | 0.366 | 0 |
| PITCH AT THE POSITION INDICATED PITCH = (COT $\beta$) ($V_h$) | 2.1445069 | 2.1177076 | 2.2553543 | 2.4986614 | 0 |

Percent Difference Between Extreme Pitch Values (Positions B & D) = 8.25%

TABLE 7
CALCULATED PITCH VALUES FOR THE INDICATED POSITIONS ON THE REFERENCE CIRCLE FOR $\alpha = 30$ DEGREES (Refer to FIG. 5)

| POSITION | A | B | C | D | E |
|---|---|---|---|---|---|
| ANGLE $\beta$ | 30 | 20 | 15 | 10 | 0 |
| COTANGENT $\beta$ | 1.7320508 | 2.7474774 | 3.7320508 | 5.67122819 | 0 |
| HORIZONTAL VELOCITY ($V_h$) | 1 | 0.634 | 0.5 | 0.366 | 0 |
| $V_h$ as a function of the Angular Velocity PITCH AT THE POSITION INDICATED PITCH = (COT $\beta$) ($V_h$) | 1.7320508 | 1.7419007 | 1.8660254 | 2.0756892 | 0 |

Percent Difference Between Extreme Pitch Values (Positions A & D) = 9.02%

TABLE 8
CALCULATED PITCH VALUES FOR THE INDICATED POSITIONS ON THE REFERENCE CIRCLE FOR $\alpha = 35$ DEGREES (Refer to FIG. 5)

| POSITION | A | B | C | D | E |
|---|---|---|---|---|---|
| ANGLE $\beta$ | 35 | 23.33 | 17.5 | 11.66 | 0 |
| COTANGENT $\beta$ | 1.428148 | 2.3182606 | 3.1715948 | 4.8430049 | 0 |
| HORIZONTAL VELOCITY ($V_h$) | 1 | 0.634 | 0.5 | 0.366 | 0 |
| $V_h$ as a function of the Angular Velocity PITCH AT THE POSITION INDICATED PITCH = (COT $\beta$) ($V_h$) | 1.428148 | 1.4697772 | 1.5857974 | 1.7725398 | 0 |

Percent Difference Between Extreme Pitch Values (Positions A & D) = 10.76%

TABLE 9
CALCULATED PITCH VALUES FOR THE INDICATED POSITIONS ON THE REFERENCE CIRCLE FOR $\alpha = 40$ DEGREES (Refer to FIG. 5)

| POSITION | A | B | C | D | E |
|---|---|---|---|---|---|
| ANGLE $\beta$ | 40 | 26.66 | 20 | 13.33 | 0 |
| COTANGENT $\beta$ | 1.1917536 | 1.9911638 | 2.7474774 | 4.2193319 | 0 |
| HORIZONTAL VELOCITY ($V_h$) | 1 | 0.634 | 0.5 | 0.366 | 0 |
| $V_h$ as a function of the Angular Velocity PITCH AT THE POSITION INDICATED PITCH = (COT $\beta$) ($V_h$) | 1.1917536 | 1.2623978 | 1.3737387 | 1.5442755 | 0 |

Percent Difference Between Extreme Pitch Values (Positions A & D) = 12.88%

TABLE 10
CALCULATED PITCH VALUES FOR THE INDICATED POSITIONS ON THE REFERENCE CIRCLE FOR $\alpha = 45$ DEGREES (Refer to FIG. 5)

| POSITION | A | B | C | D | E |
|---|---|---|---|---|---|
| ANGLE $\beta$ | 45 | 30 | 22.5 | 15 | 0 |
| COTANGENT $\beta$ | 1.0 | 1.7320508 | 2.4142136 | 3.7320508 | 0 |
| HORIZONTAL VELOCITY ($V_h$) | 1 | 0.634 | 0.5 | 0.366 | 0 |
| $V_h$ as a function of the Angular Velocity PITCH AT THE POSITION INDICATED PITCH = (COT $\beta$) ($V_h$) | 1.0 | 1.0981202 | 1.2071068 | 1.3659306 | 0 |

Percent Difference Between Extreme Pitch Values (Positions A & D) = 15.47%

TABLE 11
CALCULATED PITCH VALUES FOR THE INDICATED POSITIONS ON THE REFERENCE CIRCLE FOR $\alpha = 50$ DEGREES (Refer to FIG. 5)

| POSITION | A | B | C | D | E |
|---|---|---|---|---|---|
| ANGLE $\beta$ | 50 | 33.33 | 25 | 16.66 | 0 |
| COTANGENT $\beta$ | 0.8390996 | 1.5204262 | 2.1445069 | 3.3402328 | 0 |
| HORIZONTAL VELOCITY ($V_h$) | 1 | 0.634 | 0.5 | 0.366 | 0 |
| $V_h$ as a function of the Angular Velocity PITCH AT THE POSITION INDICATED PITCH = (COT $\beta$) ($V_h$) | 0.8390996 | 0.9639502 | 1.0722535 | 1.2225252 | 0 |

Percent Difference Between Extreme Pitch Values (Positions A & D) = 18.6%

TABLE 12
CALCULATED PITCH VALUES FOR THE INDICATED POSITIONS ON THE REFERENCE CIRCLE FOR $\alpha = 60$ DEGREES (Refer to FIG. 5)

| POSITION | A | B | C | D | E |
|---|---|---|---|---|---|
| ANGLE $\beta$ | 60 | 40 | 30 | 20 | 0 |
| COTANGENT $\beta$ | 0.5773503 | 1.1917536 | 1.7320508 | 2.7474774 | 0 |
| HORIZONTAL VELOCITY ($V_h$) | 1 | 0.634 | 0.5 | 0.366 | 0 |
| $V_h$ as a function of the Angular Velocity PITCH AT THE POSITION INDICATED PITCH = (COT $\beta$) ($V_h$) | 0.5773503 | 0.4790325 | 0.8660254 | 1.0055767 | 0 |

Percent Difference Between Extreme Pitch Values (Positions A & D) = 35.47%

TABLE 13
CALCULATED PITCH VALUES FOR THE INDICATED POSITIONS ON THE REFERENCE CIRCLE FOR $\alpha = 70$ DEGREES (Refer to FIG. 5)

| POSITION | A | B | C | D | E |
|---|---|---|---|---|---|
| ANGLE $\beta$ | 70 | 46.66 | 35 | 23.33 | 0 |
| COTANGENT $\beta$ | 0.3639702 | 0.9434514 | 1.428148 | 2.3182606 | 0 |
| HORIZONTAL VELOCITY ($V_h$) | 1 | 0.634 | 0.5 | 0.366 | 0 |
| $V_h$ as a function of the Angular Velocity PITCH AT THE POSITION INDICATED PITCH = (COT $\beta$) ($V_h$) | 0.3639702 | 0.5981482 | 0.714074 | 0.8484834 | 0 |

Percent Differences Between Extreme Pitch Values

TABLE 13-continued

CALCULATED PITCH VALUES FOR THE INDICATED
POSITIONS ON THE REFERENCE CIRCLE
FOR α = 70 DEGREES (Refer to FIG. 5)

| POSITION | A | B | C | D | E |
|----------|---|---|---|---|---|

(Positions A & D) = 39.96%

TABLE 14

CALCULATED PITCH VALUES FOR THE INDICATED
POSITIONS ON THE REFERENCE CIRCLE
FOR α = 80 DEGREES (Refer to FIG. 5)

| POSITION | A | B | C | D | E |
|----------|---|---|---|---|---|
| ANGLE β | 80 | 53.5 | 40 | 26.66 | 0 |
| COTANGENT β | 0.176327 | 0.7399611 | 1.1917536 | 1.9911638 | 0 |
| HORIZONTAL VELOCITY ($V_h$) $V_h$ as a function of the Angular Velocity | 1 | 0.634 | 0.5 | 0.366 | 0 |
| PITCH AT THE POSITION INDICATED PITCH = (COT β) ($V_h$) | 0.176327 | 0.4691353 | 0.5958768 | 0.728766 | 0 |

Percent Difference Between Extreme Pitch Values
(Positions A & D) = 61.04%

I claim:

1. A traversing blade rotary propeller useful for the application of laterally acting forces upon a fluid medium to produce propulsion as by attachment via a mount to a craft for propulsion of the craft, which comprises:
   a stationary main shaft, one end of which is suitable for attachment to the mount, the other of which is provided with gear means,
   a housing, inclusive of
      a central gear means housing into which the gear means end of said stationary main shaft is extended and supported, rotatably mounted upon said stationary main shaft, and
      peripheral gear means housings alternately disposed and adjoined to said central gear means housing,
   a pair of radial arm shafts each end of which carries gear means, alternately disposed, radially mounted, each extended from said central gear means housing to said peripheral gear means housings, a gear means end of each radial arm shaft extending into said central gear means housing to operatively engage the gear means end of said stationary main shaft such that relative movement between the engaged gear means ends of the radial arm shafts and the stationary main shaft will cause the radial arm shafts to rotate about their own axes one relative to the other in equal and opposite directions, the opposite end gear means of a radial arm shaft extending into the peripheral gear means housings,
   a pair of propeller blade shafts each mounted perpendicular to a radial arm shaft, each being equally and oppositely deflected at an angle such that the axes thereof are non-parallel with the axis of the stationary main shaft, and define equal and opposite angles relative to a line parallel with the axes of the radial arm shafts which perpendicularly intersects the stationary main shaft, one each of which carries an affixed gear means, the gear means end of each propeller blade shaft extending into the peripheral gear means housings such that a gear means thereof is operatively engaged with a gear means of each of said radial arm shafts,
   a pair of flat propeller blades, one each of which is mounted upon an end of each of said propeller blade shafts, similarly directionally oriented one with respect to the other, and
   a power means for applying force to rotate the central gear means housing relative to the stationary main shaft whereby the radial arm shafts are rotated to drive the propeller blade shafts in a direction opposite to that in which the central gear housing is rotated and to the same degree, the propeller blades one relative to the other in turn being maintained in fixed orientation as the central gear means housing is rotated relative to the stationary main shaft, while the flat propeller blades as they are moved along a continuous circular path around the axis of the stationary main shaft are oscillated in equal and opposite directions across the swath defined by the circle, each like the caudal fin of a fish or the fluke of a whale in propulsion.

2. A traversing blade rotary propeller according to claim 1 wherein the power means to which a rotary force is applied is a cylindrical member concentrically fitted over the stationary main shaft.

3. A traversing blade rotary propeller according to claim 1 wherein the radial arm shafts, and propeller shafts are operatively associated one with the other via a system of meshing gears, and power for rotation of the radial arm shafts about the axis defined by the stationary main shaft, power for rotation of the radial arm shafts about their own axes, and power for rotation of the propeller shafts are transmitted via this system of meshing gears.

4. A traversing blade rotary propeller according to claim 1 wherein the central gear means housing carries a plurality of alternately disposed pairs of peripheral gear means housings inclusive of pairs of radial arm shafts and pairs of propeller blade shafts with propellers mounted thereon.

5. A traversing blade rotary propeller according to claim 1 wherein each of the pair of propeller shafts carries a plurality of propeller blades.

6. A traversing blade rotary propeller according to claim 5 wherein the plurality of propeller blades of a propeller shaft are mounted in parallel.

7. A traversing blade rotary propeller according to claim 5 wherein the plurality of propeller blades of a propeller shaft are mounted in tandem, one behind the other.

8. A traversing blade rotary propeller useful for the application of laterally acting forces upon a fluid medium to produce propulsion as by attachment via a mount to a craft for propulsion of the craft, which comprises:
   a stationary main shaft, one end of which is suitable for attachment to the mount, the other of which is provided with a gear,
   a housing, inclusive of
      a central gear housing into which the gear end of said stationary main shaft is extended and supported, rotatably mounted upon said stationary main shaft,
      a pair of peripheral gear housings,
      a pair of tubular shaped radial arm sleeves which separate and support the peripheral gear housings in alternate, radial orientation upon the central gear housing, a pair of radial arm shafts each end of which carries a gear, alternately disposed, radially mounted, and extended from said central gear housing to said peripheral gear housings through said tubular shaped radial arm sleeves within which they are free to rotate, a gear end of each radial arm shaft extending into said central gear housing to mesh with the gear end of said stationary main shaft such that rotation of the radial arm shafts about the axis of the stationary main shaft will cause the radial arm shafts to rotate about their own axes one relative to the other in equal and opposite directions, the opposite gear end of a radial arm shaft extending into the peripheral gear housings, a pair of propeller blade shafts each mounted perpendicular to a radial arm shaft, each being equally and oppositely deflected at an angle such that the axes thereof are non-parallel with the axis of the stationary main shaft, and define equal and opposite angles relative to a line parallel with the axes of the radial arm shafts which perpendicularly intersects the stationary main shaft, one each of which carries an affixed gear, the gear end of each propeller blade shaft extending into the peripheral gear housings to mesh with a gear of each of said radial arm shafts, a pair of flat propeller blades, one each of which is mounted upon an end of each of said propeller blade shafts, similarly directionally oriented one with respect to the other, and a power shaft characterized as a tubular sleeve encircling said stationary main shaft, concentric therewith, and attached via an end to said central gear housing upon which force can be applied to rotate the central gear means housing about the axis of the stationary main shaft whereby the radial arm shafts rotate about their own axes to drive the propeller blade shafts in a direction opposite to that in which the central gear housing is rotated and to the same degree, the orientation of the propeller blades one relative to the other in turn being maintained as the central gear means housing is rotated relative to the stationary main shaft, while the propeller blades as they are moved along a continuous circular path around the axis of the stationary main shaft are oscillated in equal and opposite directions across the swath defined by the circle, each like the caudal fin of a fish or the fluke of a whale in propulsion.

9. A traversing blade rotary propeller according to claim 8 wherein the central gear housing carries a plurality of alternately disposed pairs of peripheral gear means housings, inclusive of radial arm shafts, and pairs of flat propeller blade shafts with propellers mounted thereon.

10. A traversing blade rotary propeller according to claim 8 wherein each of the pair of propeller shafts carries a plurality of flat propeller blades.

11. A traversing blade rotary propeller according to claim 9 wherein the plurality of flat propeller blades of a propeller shaft are mounted in parallel.

12. A traversing blade rotary propeller according to claim 9 wherein the plurality of propeller blades of a propeller shaft are mounted in tandem, one behind the other.

13. A fluid actuatable traversing blade rotary propeller useful as a turbine for attachment via a mount to a base, which comprises:

a stationary main shaft, one end of which is suitable for attachment to the mount, the other of which is provided with gear means, a housing, which includes a central gear means housing into which the gear means end of said stationary main shaft is extended and supported, mounted and rotatable upon said stationary main shaft, a pair of peripheral gear means housings alternately disposed and adjoined to said central gear means housing, a pair of radial arm shafts each end of which carries gear means, alternately disposed, radially mounted, and extended from said central gear means housing to said peripheral gear means housings, a gear means end of each radial arm shaft extending into said central gear means housing to operatively engage the gear means end of said stationary main shaft such that relative movement between the engaged gear means ends of the radial arm shafts and the stationary main shaft will cause the radial arm shafts to rotate about their own axes one relative to the other in equal and opposite directions, the opposite end gear means of a radial arm shaft extending into the peripheral gear means housings, a pair of propeller blade shafts each mounted perpendicular to a radial arm shaft, each being equally and oppositely deflected at an angle such that the axes thereof are non-parallel with the axis of the stationary main shaft, and define equal and opposite angles relative to a line parallel with the axes of the radial arm shafts which perpendicularly intersects the stationary main shaft, one each of which carries an affixed gear means, the gear means end of each propeller blade shaft extending into the peripheral gear means housings such that a gear means thereof is operatively engaged with a gear means of each of said radial arm shafts, a pair of fluid actuatable, flat propeller blades, one each of which is mounted upon an end of each of said propeller blade shafts, similarly directionally oriented one with respect to the other, whereby a power take off means can be located on the central gear means housing relative to the stationary main shaft such that actuation and rotation of the propellers will drive the propeller blade shafts and rotate the radial arm shafts and central gear housing in opposite directions, the orientation of the propeller blades one relative to the other in turn being maintained as the central gear means housing is rotated relative to the stationary main shaft, while the propeller blades as they are moved along a continuous circular path around the axis of the stationary main shaft are oscillated in equal and opposite directions across the swath defined by the circle, each like the caudal fin of a fish or fluke of a whale in propulsion to efficiently generate power.

* * * * *